United States Patent Office.

SYLVESTER P. WHEELER, OF BRIDGEPORT, CONNECTICUT, ASSIGNOR TO SAMUEL B. HENRY, OF SAME PLACE.

Letters Patent No. 101,553, dated April 5, 1870.

IMPROVED PROCESS OF TREATING WOOD.

The Schedule referred to in these Letters Patent and making part of the same

---

I, SYLVESTER P. WHEELER, of Bridgeport, county of Fairfield, State of Connecticut, have invented a Process of Treating Wood, of which the following is a specification.

Nature and Object of the Invention.

My invention consists in first coating or partially impregnating wood with a solution of India rubber or other equivalent gum, and then subjecting the wood thus prepared to the action of chloride of sulphur.

My invention further consists of embossed imitations of carved wood, subjected to the above treatment.

The object of my invention, which is especially applicable to the treatment of articles of compressed wood, is to render the same water-proof, and at the same time to so fix the fibers that the wood will retain the shape to which it has been compressed.

General Description.

In carrying out my invention, I first prepare a solution of India rubber. This may be effected by different processes, but I give the following, as I have found it to be most efficient in practice:

About one pound of pure India rubber is first finely divided, and then distilled in an iron retort, the heavy, dark product thus obtained being clarified by repeated distillations in a glass retort; after which, it is first agitated in nitro-hydrochloric acid, then thoroughly washed with water, and finally separated from the same.

This liquid product of the destructive distillation of rubber I mix with rectified naphtha, in about the proportion of half a gallon of the latter to about eight ounces of the liquid, and with this mixture as a solvent, I prepare the desired solution in the following manner:

To about half a gallon of the solvent I add about twenty ounces of finely-divided India rubber; and when the whole has become a homogeneous glutinous mass, I add, in small quantities at a time, more of the solvent, until about twelve ounces of rubber are held in suspension in about six gallons of the solvent. After the impurities have been removed, the solution is in a proper condition for use.

The wooden articles are coated with the solution, so that the latter can penetrate the fibers to a limited extent, and after the wood is dry it is subjected to the action of chloride of sulphur, by simply dipping the articles into the same, or subjecting them to the action of the vapor arising from the chloride when the latter is subjected to heat.

This treatment effects two purposes: the chloride of sulphur changes the character of the fibers of the wood and destroys their elasticity, and the rubber solution in the pores of the wood is vulcanized, or partly vulcanized, by the chloride, and this fixes the fibers.

The advantages of my invention will be understood when it is viewed as applied to articles of compressed wood, such as ornaments for furniture, &c., made by subjecting the end grain of the wood to suitable dies.

If these embossed imitations of carved wood are exposed to moisture, the compressed fibers are apt to swell or return to their original condition, and the figure to consequently lose its sharpness of outline. By submitting such articles to the above-described process, not only are the embossed ornaments fixed, but the surface is rendered impervious to moisture.

Fluoride of sulphur, bromide of sulphur, or iodide of sulphur may be used in place of chloride of sulphur, but the latter is to be preferred on the score of economy.

Claims.

1. The within-described process of treating wood; that is to say, coating or partially impregnating it with a solution of India rubber or its equivalent, and then subjecting it to the action of chloride of sulphur, as set forth.

2. Embossed imitations of wood-carvings, subjected to the above treatment.

In testimony whereof, I have signed my name to this specification in the presence of two subscribing witnesses.

SYLVESTER P. WHEELER.

Witnesses:
H. HOWSON,
HARRY SMITH.